US012770273B2

(12) United States Patent
Dai et al.

(10) Patent No.: US 12,770,273 B2
(45) Date of Patent: Oct. 20, 2026

(54) CLOUD OCCLUSION PREDICTION METHOD BASED ON DENSE OPTICAL FLOW METHOD

(71) Applicant: SEPCOIII ELECTRIC POWER CONSTRUCTION CO., LTD., Qingdao (CN)

(72) Inventors: Zengli Dai, Qingdao (CN); Renbao Wang, Qingdao (CN); Yu Xie, Qingdao (CN); Xiupeng Song, Qingdao (CN); Tao Li, Qingdao (CN); Zhaohui Han, Qingdao (CN); Dongxiang Wang, Qingdao (CN); Yu Jiang, Qingdao (CN)

(73) Assignee: SEPCOIII ELECTRIC POWER CONSTRUCTION CO., LTD., Qingdao (CN)

( * ) Notice: Subject to any disclaimer, the term of this patent is extended or adjusted under 35 U.S.C. 154(b) by 122 days.

(21) Appl. No.: 18/857,789

(22) PCT Filed: Jun. 5, 2023

(86) PCT No.: PCT/CN2023/098235
§ 371 (c)(1),
(2) Date: Oct. 17, 2024

(87) PCT Pub. No.: WO2023/236886
PCT Pub. Date: Dec. 14, 2023

(65) Prior Publication Data

US 2025/0272851 A1 Aug. 28, 2025

(30) Foreign Application Priority Data

Jun. 10, 2022 (CN) ........................ 202210651845.1

(51) Int. Cl.
*G06T 7/246* (2017.01)
*G06T 5/70* (2024.01)
(Continued)

(52) U.S. Cl.
CPC ................ *G06T 7/246* (2017.01); *G06T 5/70* (2024.01); *G06T 7/292* (2017.01); *G06T 7/73* (2017.01);
(Continued)

(58) Field of Classification Search
CPC G06T 7/246; G06T 5/70; G06T 7/292; G06T 7/73; G06T 11/10;
(Continued)

(56) References Cited

U.S. PATENT DOCUMENTS

| | | | | |
|---|---|---|---|---|
| 10,303,942 B2 * | 5/2019 | Chang | ..................... | G01W 1/10 |
| 2010/0309330 A1 * | 12/2010 | Beck | ..................... | G01W 1/10 348/222.1 |

(Continued)

FOREIGN PATENT DOCUMENTS

| | | |
|---|---|---|
| CN | 106780540 A | 5/2017 |
| CN | 108871290 A | 11/2018 |

(Continued)

OTHER PUBLICATIONS

"Cloud Motion Identification Algorithms Based on All-Sky Images to Support Solar Irradiance Forecast"; Lydie Magnone; 2017 IEEE 44th Photovoltaic Specialist Conference (PVSC) (2017, pp. 1415-1420) (Year: 2017).*

(Continued)

*Primary Examiner* — Michael S Osinski

(57) ABSTRACT

The present invention discloses a cloud occlusion prediction method based on a dense optical flow method. The method disclosed by the present invention can better predict the cloud occlusion time and improve the tracking accuracy by (Continued)

tracking the movement of the entire cloud cluster, and can continuously track the newly-appeared cloud cluster.

10 Claims, 2 Drawing Sheets

(51) Int. Cl.
*G06T 7/292* (2017.01)
*G06T 7/73* (2017.01)
*G06T 11/10* (2026.01)
*G06V 20/40* (2022.01)

(52) U.S. Cl.
CPC .............. *G06T 11/10* (2026.01); *G06V 20/41* (2022.01); *G06T 2207/10016* (2013.01)

(58) Field of Classification Search
CPC . G06T 2207/10016; G06T 2207/10032; G06T 2207/30192; G06T 7/269; G06T 7/90; G06V 20/41; G06V 20/70; G06V 20/40; G01W 2203/00; G01W 1/10; G01W 1/12; Y02A 90/10
See application file for complete search history.

(56) References Cited

U.S. PATENT DOCUMENTS

| | | | | |
|---|---|---|---|---|
| 2015/0134251 | A1* | 5/2015 | Bixel | G01W 1/12 700/287 |
| 2015/0301226 | A1* | 10/2015 | Sun | G01J 1/4204 702/3 |
| 2017/0031056 | A1* | 2/2017 | Vega-Avila | G01W 1/10 |
| 2017/0124694 | A1* | 5/2017 | Ma | G06T 7/0004 |
| 2018/0232557 | A1* | 8/2018 | Chang | G01W 1/10 |
| 2019/0158011 | A1* | 5/2019 | West | G01J 1/0228 |
| 2020/0082547 | A1* | 3/2020 | Xie | G06T 7/246 |
| 2020/0132884 | A1* | 4/2020 | Rothenberg | G06N 5/04 |
| 2020/0380283 | A1* | 12/2020 | Georgy | G06T 7/174 |
| 2021/0110565 | A1* | 4/2021 | Takashima | G06T 3/40 |
| 2022/0138962 | A1* | 5/2022 | Herbon | G06T 7/20 382/103 |
| 2023/0067783 | A1* | 3/2023 | Raedsch | G06V 20/49 |
| 2023/0186445 | A1* | 6/2023 | DeLuca | G06T 5/77 382/100 |
| 2024/0412384 | A1* | 12/2024 | Shinkuma | G16Y 40/10 |
| 2025/0200742 | A1* | 6/2025 | Li | G06T 7/269 |

FOREIGN PATENT DOCUMENTS

| | | |
|---|---|---|
| CN | 108871290 Y | 11/2018 |
| CN | 111583298 A | 8/2020 |
| CN | 111583298 Y | 8/2020 |
| CN | 115170619 | 10/2022 |

OTHER PUBLICATIONS

"Short term cloud coverage prediction using ground based all sky imager"; Shanhui Sun; 2014 IEEE International Conference on Smart Grid Communications (SmartGridComm) (2014, pp. 121-126) (Year: 2014).*
"Intrahour Cloud Tracking Based on Optical Flow"; Songiie Zhang; 2019 Chinese Control Conference (CCC) (2019, pp. 3023-3028) (Year: 2019).*
"Short Term Solar Irradiance Forecast based on Image Processing and Cloud Motion Detection"; Soumya Tiwari; 2019 IEEE Texas Power and Energy Conference (TPEC) (2019, pp. 1-6) (Year: 2019).*

* cited by examiner

CLOUD OCCLUSION PREDICTION METHOD BASED ON DENSE OPTICAL FLOW METHOD

CROSS REFERENCE TO RELATED APPLICATIONS

This application is a national stage filing under 35 U.S.C. § 371 of international application number PCT/CN2023/098235, filed on Jun. 5, 2023, which claims priority to Chinese patent application No. 202210651845.1, filed on Jun. 10, 2022. The contents of these applications are incorporated herein by reference in their entirety.

TECHNICAL FIELD

The present invention relates to the technical field of solar thermal power generation, and in particular, to a cloud occlusion prediction method based on a dense optical flow method.

BACKGROUND

The occlusion of cloud clusters to the sun will affect the stability of the photothermal power generation system. Since the light source collected by the light field before and after the cloud cluster occlusion changes greatly, the temperature of a heat absorber changes greatly, which may cause damage to the heat absorber and cause production accidents. Therefore, predicting the arrival of cloud clusters in advance and reducing the light sources reflected onto the heat absorber in advance is an effective means to avoid damage to the heat absorber. Meteorological data such as weather forecasts can only predict whether it will be cloudy in a long time period, however, it is impossible to determine when the cloud clusters will occlude the sun, making it impossible to collect light. An effective means to predict when occlusion will occur is generally through image processing. The existing methods either treat clouds as shape-constant objects for prediction, or extract cloud feature points for tracking.

For example, Chinese Patent No. CN111583298A entitled "SHORT-TERM CLOUD IMAGE TRACKING METHOD BASED ON OPTICAL FLOW METHOD" uses Lucas-Kanade optical flow method to perform short-time cloud image tracking. The Lucas-Kanade optical flow method is a sparse optical flow method that first extracts feature points and then tracks the feature points. Cloud image tracking based on the optical flow method has the following two problems.

1. In the cloud cluster movement process, the feature points can change, and the appearance of a new cloud cluster introduces new feature points. How to perform the feature point update and when to perform the feature point update are difficult problems to solve. However, the above patent gives no solution.
2. The sun area generates feature points due to light changes and the patent gives no solution to this problem.

The shape of the cloud cluster changes continuously, and the feature points change, so that a centroid method and a feature point method have certain defects. Therefore, it is necessary to design a new technical solution to solve the above problems.

SUMMARY

In order to solve the technical problems, the present invention provides a cloud occlusion prediction method based on a dense optical flow method, which can better predict the cloud occlusion time and improve the tracking accuracy by tracking the movement of the entire cloud cluster, and can continuously track the newly-appeared cloud cluster.

For the above purposes, the technical solutions of the present invention are as follows:

A cloud occlusion prediction method based on a dense optical flow method comprises the following steps:

step 1: collecting a real-time sky video by a video collecting device, and converting the real-time sky video into a picture sequence;

step 2: preprocessing the collected picture sequence, eliminating irrelevant image information and only retaining a sky area;

step 3: performing cloud identification and judgment on the obtained sky area;

step 4: performing dense optical flow calculation on the picture sequence obtained in the step 1 to obtain a velocity and direction of each of pixel points;

step 5: determining a cloud cluster movement area according to the obtained velocity of the pixel point;

step 6: removing outliers according to the velocity and direction of the pixel point to correct the cloud cluster movement velocity; and step 7: predicting a start time and an end time of cloud occlusion according to the determined cloud cluster movement area and the corrected cloud cluster movement velocity.

In the above solution, the video collecting device comprises a plurality of pinhole cameras.

In another technical solution, the video collecting device is an all-sky imager or a common fisheye camera, and the prediction method further comprises coordinate transformation between the step 5 and the step 6.

In a further technical solution, in the step 3, the method for cloud identification and judgment comprises a threshold judgment method of a channel ratio, a machine learning method or a deep learning method.

In a further technical solution, in the step 4, the dense optical flow method is a Farneback algorithm.

In a further technical solution, the Farneback algorithm is used to calculate a velocity and direction of each of pixel points as follows:

firstly, performing graying processing on an image: performing linear transformation on the image, converting the image into an HSV color space, and using a brightness dimension V of the color space as gray information:

$$V = \max(R, G, B)$$

wherein R, G and B respectively represent brightness values of red, green and blue in an RGB color space;

then, regarding a gray value of the image pixel point as a function $f(x,y)$ of a two-dimensional variable, taking an interested pixel point as a center to construct a local coordinate system, and performing binomial expansion on the function, wherein the function is represented as:

$$f(x, y) = f(x) = x^T Ax + b^T x + c$$

wherein x is a two-dimensional column vector, A is a 2×2 symmetric matrix, b is a 2×1 matrix, $f(x)$ is equivalent to $f(x,y)$ and represents a gray value of the pixel point, and c represents a constant term of binomial expansion; if the pixel point moves, the whole polynomial changes, and a displacement is d; A is unchanged before and after the displacement and is separately represented as:

$$f_1(x) = x^T A x + b_1^T x + c_1$$

$$f_2(x) = x^T A x + b_2^T x + c_2$$

wherein $b_1$ and $b_2$ respectively represent 2×1 matrix before and after change, and $c_1$ and $c_2$ respectively represent the constant term before and after change;

the constraint is thus obtained:

$$Ad = \Delta b$$

wherein $$\Delta b = \frac{b_2 - b_1}{2}$$

finally, establishing an objective function:

$$\|Ad - b\|^2$$

minimizing the objective function to solve the displacement d, and dividing the displacement d by the time when the displacement occurs to obtain a velocity vector.

In a further technical solution, the specific method for the step 5 is as follows:

(1) determining an effective velocity threshold;

(2) removing cloud movement noise data;

(3) calculating cloud detection confidence;

(4) calculating movement confidence; and (5) determining a cloud cluster movement area according to the confidences of the cloud detection and the movement detection.

In a further technical solution, the specific method for the step 6 is as follows:

(1) determining a velocity range of the effective cloud movement;

(2) setting the velocity out of the range to zero and then taking the average direction of the velocities with similar values but different directions;

(3) correcting the velocity in a sliding window from top to bottom and from left to right on a pseudo image generated by calculating the velocity vector generated in the step 4 by using the sliding window.

In a further technical solution, the specific method for the step 7 is as follows:

assuming that center coordinates and a radius of the sun in the sky in the image are respectively $(x_0, y_0)$ and $r_0$; a point on an edge of the Sun's disk is represented by $(x_0+r_0 \cos\theta, y_0+r_0 \sin\theta)$, $0\le\theta<2\pi$; and coordinates of a specific cloud pixel point are $(x_1, y_1)$ and the velocity vector is $(u_1, v_1)$;

firstly, judging whether $|v_1\Delta x-u_1\Delta y|\le r_0\sqrt{u_1^2+v_1^2}$ is satisfied, wherein if no t, the point cannot reach the sun area and there is no need to continue the calculation;

then, calculating a time $t_1$ of the cloud pixel point reaching the sun, and expressing the time as follows:

$$t_1 = \min\left(\frac{x_1 - x_0 + r_0\cos\left(\sin^{-1}\frac{v_1\Delta x - u_1\Delta y}{r_0\sqrt{u_1^2+v_1^2}} + \tan^{-1}(v_1, u_1)\right)}{u_1}, \frac{x_1 - x_0 + r_0\cos\left(\pi - \sin^{-1}\frac{v_1\Delta x - u_1\Delta y}{r_0\sqrt{u_1^2+v_1^2}} + \tan^{-1}(v_1, u_1)\right)}{u_1}\right)$$

wherein if $t_1$ is less than 0, it indicates that the cloud pixel point moves towards a direct ion far away from the sun and is discarded;

a leaving time $t_2$ of the cloud pixel point is represented as:

$$t_2 = \max\left(\frac{x_1 - x_0 + r_0\cos\left(\sin^{-1}\frac{v_1\Delta x - u_1\Delta y}{r_0\sqrt{u_1^2+v_1^2}} + \tan^{-1}(v_1, u_1)\right)}{u_1}, \frac{x_1 - x_0 + r_0\cos\left(\pi - \sin^{-1}\frac{v_1\Delta x - u_1\Delta y}{r_0\sqrt{u_1^2+v_1^2}} + \tan^{-1}(v_1, u_1)\right)}{u_1}\right)$$

finally, determining an arrival time of each of cloud pixel points, wherein a minimum value is the time when a cloud front end arrives at the solar area, and a maximum value in the leaving times of the cloud pixel points is a predicted time when all the cloud clusters leave the sun area.

In a further technical solution, the method for coordinate transformation is as follows:

first, assuming that points in a camera coordinate system are (x,y,z), pixel coordinates are (u,v), and calculating a distance ξ between a camera center and a sphere center, and focal lengths $f_x$ and $f_y$ in x and y directions of the camera coordinate system through known coordinate points by using the following formula:

$$\begin{bmatrix} x \\ y \\ z \end{bmatrix} = \frac{1}{d}\left(\frac{\xi + \sqrt{1 + (1-\xi^2)(\tilde{u}^2+\tilde{v}^2)}}{\tilde{u}^2+\tilde{v}^2+1}\begin{bmatrix} \tilde{u} \\ \tilde{v} \\ 1 \end{bmatrix} - \begin{bmatrix} 0 \\ 0 \\ \xi \end{bmatrix}\right)$$

wherein $$\begin{bmatrix} \tilde{u} \\ \tilde{v} \end{bmatrix} = \begin{bmatrix} \frac{u - c_x}{f_x} \\ \frac{v - c_y}{f_y} \end{bmatrix}$$

d is a distance from point (x,y,z) to the origin of the camera coordinate system, and $(c_x,c_y)$ are coordinates of the image center;

then, for the actually collected image, calculating actual coordinates of each pixel through the above two formulas, and then calculating image corresponding to the pinhole camera by combining the following formula:

$$\begin{bmatrix} u' \\ v' \end{bmatrix} = \begin{bmatrix} f_x \frac{x}{z} + c_x \\ f_y \frac{y}{z} + c_y \end{bmatrix}.$$

With the above technical solutions, the cloud occlusion prediction method based on a dense optical flow method provided by the present invention has the following beneficial effects:

1. The present invention can overcome the technical difficulties of continuous tracking and feature point updating caused by the continuous changes in cloud shape by tracking the movement of the entire cloud cluster, can better predict the occlusion time of the cloud cluster, can improve the tracking accuracy, and can continuously track the newly-appeared cloud cluster.
2. The present invention uses a dense optical flow method to combine with the frame extraction to perform movement detection and velocity calculation without inputting feature points, and can directly provide the velocity vector of each pixel point of the moving object.
3. The present invention removes outliers according to the velocity and direction of the pixel points to correct the moving velocity of the cloud cluster, and eliminates abnormal data caused by the movement of other objects, false detection caused by the noise of the image, false detection caused by light change and the like, so that the accuracy of prediction is improved.
4. According to the present invention, the method for calculating the start and end time of cloud occlusion does not require separately calculating whether the cloud occlusion can arrive and the time when the cloud occlusion arrives for each point in the sun area, the start time and the end time can be calculated at the same time, and the calculation amount is greatly saved.

BRIEF DESCRIPTION OF DRAWINGS

In order to more clearly illustrate the technical solutions in the embodiments of the present invention or in the prior art, the drawings required to be used in the description of the embodiments or the prior art will be briefly introduced below.

DETAILED DESCRIPTION OF EMBODIMENTS

The technical solutions in the embodiments of the present invention will be clearly and fully described below with reference to the drawings in the embodiments of the present invention.

Figure 1:
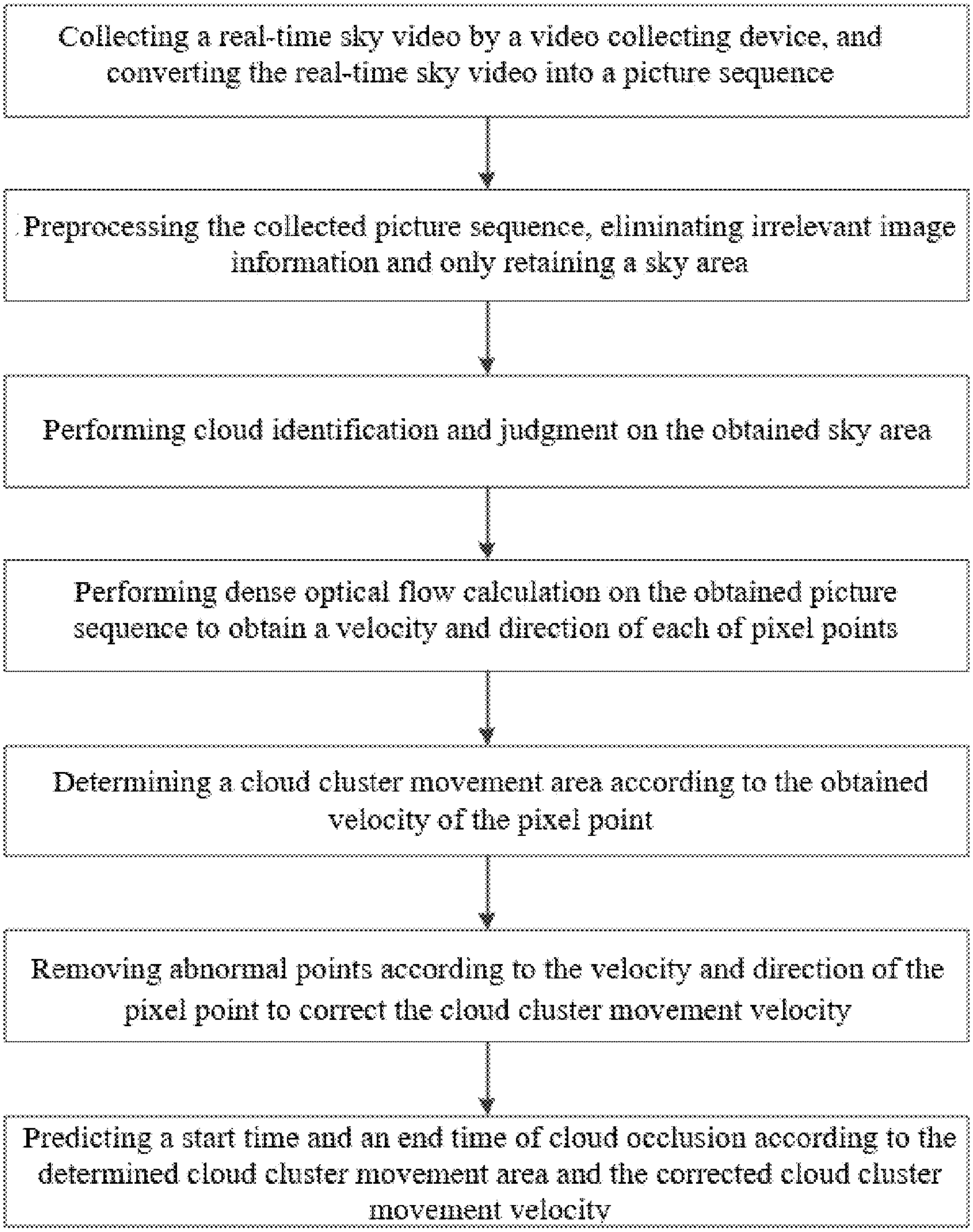
FIG. 1 is a schematic diagram of a cloud occlusion prediction method based on a dense optical flow method disclosed in Embodiment 2 of the present invention.

The present invention provides a cloud occlusion prediction method based on a dense optical flow method, as shown in FIG. 1, the specific embodiment is as follows:

Embodiment 1

Step 1: Collecting a Real-Time Sky Video by an all-Sky Imager or a Common Fisheye Camera, and Converting the Real-Time Sky Video into a Picture Sequence.

The video is collected by using the all-sky imager or the common fisheye camera, and each frame of image in the video is extracted. Keeping only 1 frame of image for a specific time interval (e.g., 1 second) can reduce the calculation amount. The time interval is determined according to the performance of the computing equipment and the prediction precision requirement, and is generally between 1 and 60 seconds. The image uses the RGB color space, namely red, green and blue.

Step 2: Preprocessing the Collected Picture Sequence, Eliminating Irrelevant Image Information and Only Retaining a Sky Area.

Firstly, a picture is collected by a camera that actually collects a cloud image, the ground vistas and buildings that are irrelevant to the sky are marked in the picture, and a mask matrix is generated. Then, in preprocessing the actually collected picture, pixels irrelevant to the sky are removed using the mask matrix and converted into pixels that cannot be recognized as clouds, such as a sky.

Thirdly, cloud identification and judgment is performed on the obtained sky area.

In the image, the area near the sun is easily recognized as cloud clusters, so the solar background subtraction needs to be performed first. The solar background can be learned through clear sky image data collection and combined with artificial neural network methods. In actual use, the clear sky image is first generated through the model, and then subtracted from the actual image.

In the all-sky image, the blue sky is represented by a larger gray value in the blue channel and a smaller gray value in the red channel; thick clouds appear to have little difference between the gray value of the blue channel and the gray value of the red channel; and thin clouds tend to be somewhere in between. Therefore, whether it is thin cloud, thick cloud and blue sky can be judged according to different performances of the object in the red and blue channels, a common and simple threshold segmentation method is often used, and the segmentation methods are also different according to the different compositions of the red and blue channels. When the red-blue ratio is less than $p_1$, it is determined blue sky, the red-blue ratio is greater than $p_1$ and less than $p_2$, it is determined thin cloud, the red-blue ratio is greater than $p_2$, it is determined thick cloud, and when the average value of the three channels is greater than 238, it is determined the sun (before background subtraction, this point will not be considered after subtraction). The three thresholds can be determined statistically by collecting sky data, and the determination of thick clouds and thin clouds is subject to human calibration. The method for cloud identification and judgment comprises a threshold judgment method of a channel ratio, a machine learning method or a deep learning method, which can be combined with each other. In addition, a clear-sky background fitting needs to be considered, and background subtraction can be used for cloud detection of the sun area.

Step 4: Performing Dense Optical Flow Calculation on the Picture Sequence Obtained in the Step 1 to Obtain a Velocity and Direction of Each of Pixel Points.

The optical flow method is an effective method for detecting movement. The use of the sparse optical flow method for cloud detection has problems such as the disappearance of feature points due to cloud cluster changes and the difficulty in updating feature points due to the appearance of new cloud clusters. The dense optical flow method does not need to input feature points and can directly provide the velocity vector of each pixel point of the moving object. The Farneback algorithm, which is recognized as having the best effect, is used here. Other dense optical flow methods can also be used based on the same principle.

The dense optical flow method has two major drawbacks. Firstly, the calculation amount is large, and if each frame is calculated, the real-time performance is lost; and secondly, although the velocity vector of each pixel point can be given, the fluctuation of the velocity vector and the noise velocity vector with the velocity close to zero can be caused by factors such as illumination change in practice. For the first point, the calculation amount can be reduced by extracting frames in the step 1. Since the pixel movement velocity of clouds in the sky is small, there is no need to perform dense optical flow calculations every frame. For the second point, refer to the movement velocity correction in the step 6.

The Farneback algorithm is used to calculate a velocity and direction of each of pixel points as follows:

firstly, performing graying processing on an image: performing linear transformation on the image, converting the image into an HSV color space, and using a brightness dimension V of the color space as gray information:

$$V = \max(R, G, B)$$

wherein R, G and B respectively represent brightness values of red, green and blue in an RGB color space;

then, regarding a gray value of the image pixel point as a function $f(x,y)$ of a two-dimensional variable, taking an interested pixel point as a center to construct a local coordinate system, and performing binomial expansion on the function, wherein the function is represented as:

$$f(x, y) = f(x) = x^T Ax - b^T x + c$$

wherein x is a two-dimensional column vector, A is a 2×2 symmetric matrix, b is a 2×1 matrix, $f(x)$ is equivalent to $f(x,y)$ and represents a gray value of the pixel point, and c represents a constant term of binomial expansion; if the pixel point moves, the whole polynomial changes, and a displacement is d; A is unchanged before and after the displacement and is separately represented as:

$$f_1(x) = x^T Ax + b_1^T x + c_1$$

$$f_2(x) = x^T Ax + b_2^T x + c_2$$

wherein $b_1$ and $b_2$ respectively represent 2×1 matrix before and after change, and $c_1$ and $c_2$ respectively represent the constant term before and after change;

the constraint is thus obtained:

$$Ad = \Delta d$$

wherein $$\Delta b = \frac{b_2 - b_1}{2}$$

finally, establishing an objective function:

$$\|Ad - b\|^2$$

minimizing the objective function to solve the displacement d, and dividing the displacement d by the time when the displacement occurs to obtain a velocity vector.

Step 5: Determining a Cloud Cluster Movement Area According to the Obtained Velocity of the Pixel Point.

(1) Determining an Effective Velocity Threshold:

The velocities calculated by the dense optical flow method at a plurality of time points are collected and compared with objects manually calibrated as stationary to determine a minimum threshold $v_{thre1}$ of effective velocity, that is, the cloud cluster having a velocity that is less than this minimum threshold is considered to be stationary.

(2) Removing Cloud Movement Noise Data:

All the velocities of moving pixel points whose velocity is less than the minimum threshold $v_{thre1}$ of the effective velocity are set to 0.

(3) Calculating Cloud Detection Confidence:

It is considered that, a pixel point with a red-blue ratio as the threshold $p_1$ being a cloud has a confidence of 0.5, a pixel point with a red-blue ratio greater than the threshold $p_2$ being a cloud has a confidence of 1, a pixel point with a red-blue ratio less than the threshold $p_1$ is considered a blue sky, the confidence comparison is not needed, and the calculation is not needed. A point with a red-blue ratio between $p_1$ and $p_2$ can be obtained by interpolation. For example, linear interpolation uses the following formula to calculate the confidence:

$$\text{Cloud identification confidence} = \frac{\text{Red} - \text{blue ratio} - p_1}{p_2 - p_1} \cdot 0.5 + 0.5.$$

(4) Calculating Movement Confidence:

The average value of the velocities of the pixel points is $|\bar{v}|$, it is considered that a point with a velocity greater than $q|\bar{v}|$ being a moving cloud has a confidence of 1, a point with a velocity of $v_{thre1}$ being a moving cloud has a confidence of 0, the parameter q is less than 1, and the actual value is determined statistically by the measured data. A confidence of a point with a velocity between $q|\bar{v}|$ and 0 can be calculated by interpolation, such as linear interpolation method:

$$\text{Cloud} \cdot \text{movement}^\wedge\text{confidence} = \frac{\text{Red} - \text{blue} \cdot \text{ratio} - p_1}{p_2 - p_1} \cdot 0.5 + 0.5.$$

(5) Determining a Cloud Cluster Movement Area According to the Confidences of the Cloud Detection and the Movement Detection:

When the confidence of the movement detection is higher or the confidences of the cloud detection and the movement detection are close, the overlapped area of the cloud cluster detection and the movement detection (an optical flow method) is taken as a cloud cluster movement area, and when the confidence of the cloud detection is high, it is considered that the cloud cluster area identified by the cloud detection method is always correct, and the cloud movement is corrected (see the step 7). In this way, both cases of false detection as clouds and false detection of other moving objects as clouds can be removed.

Step 6: Coordinate Transformation.

The all-sky imager uses a fisheye camera, and its pixel coordinates are distorted, which is inconvenient for subsequent processing. The pixel coordinates need to be converted into ordinary pinhole camera coordinates.

First, assuming that the point in the camera coordinate system is (x,y,z) and pixel coordinates are (u,v), the projection formula is $$\begin{bmatrix} u \\ v \end{bmatrix} = \begin{bmatrix} f_x \dfrac{x}{\xi d + z} + c_x \\ f_y \dfrac{y}{\xi d + z} + c_y \end{bmatrix}$$

$$d = \sqrt{x^2 + y^2 + z^2}$$

$\xi$ is a distance between the camera center and the sphere center, d is the distance from point (x,y,z) to the origin of the camera coordinate system, $(c_x, c_y)$ is the coordinates of the image center, and $f_x$ and $f_y$ are the focal lengths in the x and y directions of the camera coordinate system respectively;

the back-projection is as follows:

$$\begin{bmatrix} x \\ y \\ z \end{bmatrix} = \frac{1}{d}\left( \frac{\xi + \sqrt{1 + (1-\xi^2)(\tilde{u}^2 + \tilde{v}^2)}}{\tilde{u}^2 + \tilde{v}^2 + 1} \begin{bmatrix} \tilde{u} \\ \tilde{v} \\ 1 \end{bmatrix} - \begin{bmatrix} 0 \\ 0 \\ \xi \end{bmatrix} \right)$$

wherein $$\begin{bmatrix} \tilde{u} \\ \tilde{v} \end{bmatrix} = \begin{bmatrix} \dfrac{u - c_x}{f_x} \\ \dfrac{v - c_y}{f_y} \end{bmatrix}$$

calculating a distance $\xi$ between a camera center and a sphere center, and focal lengths $f_x$ and $f_y$ in x and y directions of the camera coordinate system through known coordinate points by using the above formula:

then, for the actually collected image, calculating actual coordinates of each pixel through the above two formulas, and then calculating image corresponding to the pinhole camera by combining the following formula:

$$\begin{bmatrix} u' \\ v' \end{bmatrix} = \begin{bmatrix} f_x \dfrac{x}{z} + c_x \\ f_y \dfrac{y}{z} + c_y \end{bmatrix}.$$

Step 7: Removing Outliers According to the Velocity and Direction of the Pixel Point to Correct the Cloud Cluster Movement Velocity.

In actual detection, most of the detected movement originates from cloud movement. After coordinate transformation, the velocity and direction of the cloud movement on the image are basically consistent, and other movements deviating from the cloud movement vector should be considered as abnormal data (which may be derived from movements of other objects, false detection caused by noise of the image, false detection caused by light change, and the like). This method fails when there is no or little cloud in the sky, and is therefore used in conjunction with cloud detection results. A specific method is as follows:

(1) determining a velocity range of the effective cloud movement, namely determining two thresholds, which is implemented as follows:

(i) collecting video data of a plurality of cloud clusters moving at different times;

(ii) calculating the velocity by using a dense optical flow method;

(iii) removing the velocity of non-cloud cluster area, the velocity of cloud cluster in the solar area and the abnormal velocity of other cloud cluster areas;

(iv) taking a minimum value in the cleared data as a threshold 1 and the maximum value as a threshold 2.

Figure 2:
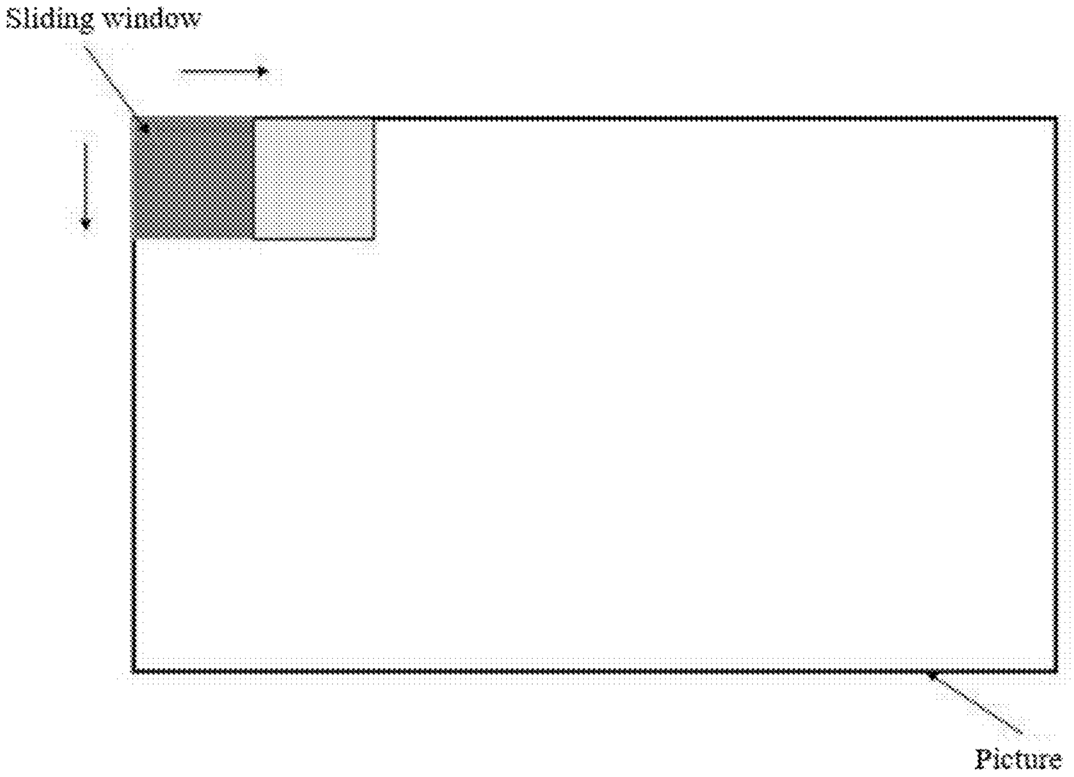
FIG. 2 is a schematic diagram of velocity correction by using a sliding window method.

(2) setting the velocity values less than a certain threshold (threshold 1) and greater than a certain threshold (threshold 2) to zero, and then taking the average direction of the velocities with similar values but different directions; and (3) correcting the velocity in a sliding window from top to bottom and from left to right on a pseudo image generated by calculating the velocity vector generated in the step 4 by using the sliding window, wherein the sliding window algorithm is shown in FIG. 2. The specific method for correcting the velocity in a sliding window is as follows: the image here refers to a two-channel pseudo image composed of velocity vectors, and has the same size as an image detected by an optical flow method. The first channel represents the x-component of the velocity and the second channel represents the y-component of the velocity. From these two components, the value and direction of the velocity can be determined.

(i) The velocities in the two thresholds in the sliding window are averaged to 5, and the velocity in the $[\bar{v}(1-m), \bar{v}(1+m)]$ range is retained, wherein m is an empirical parameter, and the detected movement area can be consistent with the actual movement cloud cluster area after adjustment, generally 0.1. The velocity of the pixel points in the sliding window except the pixel point with the velocity retained is set to be 0.

(ii) The velocity directions of the retained pixels are averaged again to $\vec{u}$, and the directions and sizes of these retained pixel points are set to $\vec{u}$ and $\bar{v}$, respectively.

Step 8: Predicting a Start Time and an End Time of Cloud Occlusion According to the Determined Cloud Cluster Movement Area and the Corrected Cloud Cluster Movement Velocity.

Assuming that center coordinates and a radius of the sun in the sky in the image are respectively $(x_0, y_0)$ and $r_0$; a point on an edge of the Sun's disk is represented by $(x_0+r_0 \cos\theta, y_0+r_0 \sin\theta)$, 0≤0<21; and coordinates of a specific cloud pixel point are $(x_1, y_1)$ and the velocity vector is $(u_1, v_1)$.

The derivation process is as follows:

If after time t, this pixel point happens to reach a point on the edge of the sun, then $$t=\frac{x_0+r_0\cos\theta-x_1}{u_1}=\frac{y_0+r_0\sin\theta-y_1}{v_l}$$

setting $\Delta x=x_0-x_1$, $\Delta y=y_0-y_1$, then $$v_1\Delta x+v_1r_0\cos\theta=u_1\Delta y+u_1r_0\sin\theta$$

$$v_1\Delta x-u_1\Delta y=u_1r_0\sin\theta-v_1r_0\cos\theta$$

$$v_1\Delta x-u_1\Delta y=r_0\sqrt{u_1^2+v_1^2}\left(\frac{u_1}{\sqrt{u_1^2+v_1^2}}\sin\theta-\frac{v_1}{\sqrt{u_1^2+v_1^2}}\cos\theta\right)$$

setting $$\cos\varphi=\frac{u_1}{\sqrt{u_1^2+v_1^2}}$$

$$\sin\varphi=\frac{v_1}{\sqrt{u_1^2+v_1^2}}$$

then $\varphi=\tan^{-1}(v_1,u_1)$ $$v_1\Delta x-u_1\Delta y=r_0\sqrt{u_1^2+v_1^2}\,(\cos\varphi\sin\theta-\sin\varphi\cos\theta)$$

$$v_1\Delta x-u_1\Delta y=r_0\sqrt{u_1^2+v_1^2}\,\sin(\theta-\varphi)$$

then, the following defining conditions can be derived:

$$|v_1\Delta x-u_1\Delta y|\le r_0\sqrt{u_1^2+v_1^2}$$

the following can be derived $$\theta=\sin^{-1}\frac{v_1\Delta x-u_1\Delta y}{r_0\sqrt{u_1^2+v_1^2}}+\varphi$$

or $$\theta=\pi-\sin^{-1}\frac{v_1\Delta x-u_1\Delta y}{r_0\sqrt{u_1^2+v_1^2}}+\varphi$$

substituted into $$t=\frac{\Delta x+r_0\cos\theta}{u_1}$$

The time can be found.

The specific implementation calculation process is as follows:

firstly, judging whether $|v_1\Delta x-u_1\Delta y|\le r_0\sqrt{u_1^2+v_1^2}$ is satisfied, wherein if no t, the point cannot reach the sun area and there is no need to continue the calculation;

then, calculating a time $t_1$ of the cloud pixel point reaching the sun, and expressing the time as follows:

$$t_1=\min\left(\frac{x_1-x_0+r_0\cos\left(\sin^{-1}\frac{v_1\Delta x-u_1\Delta y}{r_0\sqrt{u_1^2+v_1^2}}+\tan^{-1}(v_1,u_1)\right)}{u_1},\ \frac{x_1-x_0+r_0\cos\left(\pi-\sin^{-1}\frac{v_1\Delta x-u_1\Delta y}{r_0\sqrt{u_1^2+v_1^2}}+\tan^{-1}(v_1,u_1)\right)}{u_1}\right)$$

wherein if $t_1$ is less than 0, it indicates that the cloud pixel point moves towards a direct ion far away from the sun and is discarded;

a leaving time $t_2$ of the cloud pixel point is represented as:

$$t_2=\max\left(\frac{x_1-x_0+r_0\cos\left(\sin^{-1}\frac{v_1\Delta x-u_1\Delta y}{r_0\sqrt{u_1^2+v_1^2}}+\tan^{-1}(v_1,u_1)\right)}{u_1},\ \frac{x_1-x_0+r_0\cos\left(\pi-\sin^{-1}\frac{v_1\Delta x-u_1\Delta y}{r_0\sqrt{u_1^2+v_1^2}}+\tan^{-1}(v_1,u_1)\right)}{u_1}\right)$$

finally, determining an arrival time of each of cloud pixel points, wherein a minimum value is the time when a cloud front end arrives at the solar area, and a maximum value in the leaving times of the cloud pixel points is a predicted time when all the cloud clusters leave the sun area.

Figure 3:
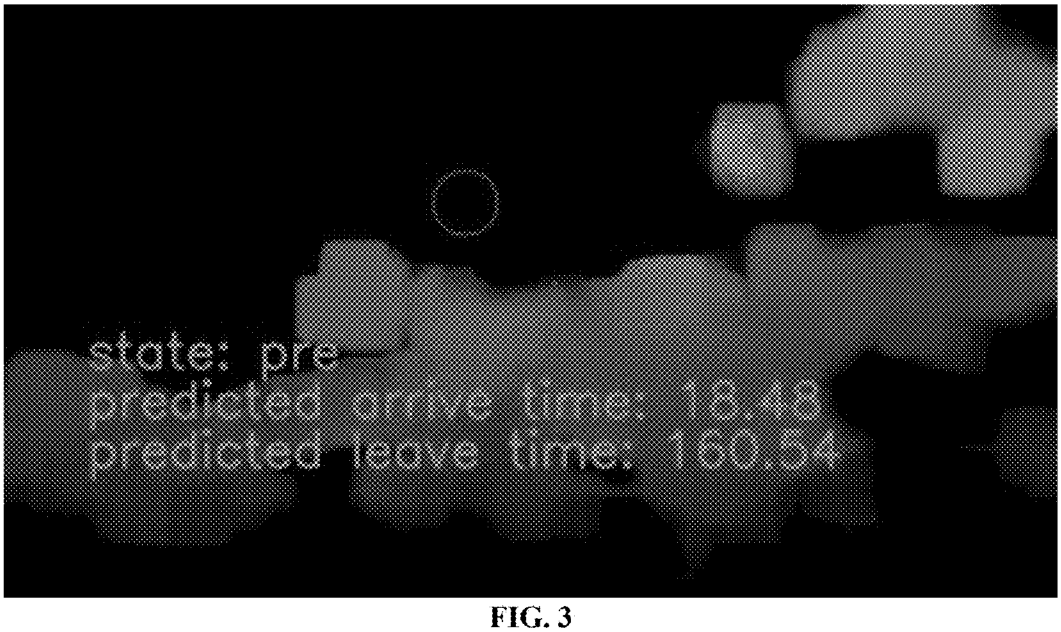
FIG. 3 is a schematic diagram of the prediction of a time when a cloud cluster arrives at the sun and an end time.

As shown in FIG. 3, it has been transformed into the coordinate system of the pinhole camera. In the figure, the gray area represents a moving cloud, the black area represents clear sky, the circle represents a solar area, and the front end of the cloud cluster predicted to arrive at the solar area is specially marked with light gray. The color depth of the gray area represents the vector direction (excluding the specially front end of cloud cluster). It can be seen from the figure that the direction of cloud cluster movement is basically the same.

Embodiment 2

In this embodiment, a plurality of pinhole cameras are used for image collection, and each camera is responsible for an area of the sky.

The specific method of this embodiment is different from that of Embodiment 1 in that the coordinate transformation in the step 6 is omitted, and the remaining steps are the same.

The above description of the disclosed embodiments enables those skilled in the art to implement or use the present invention. Various modifications to these embodiments will be readily apparent to those skilled in the art, and the generic principles defined herein may be applied to other embodiments without departing from the spirit or scope of the present invention. Thus, the present invention is not intended to be limited to these embodiments shown herein but is to be accorded the broadest scope consistent with the principles and novel features disclosed herein.

What is claimed is:

1. A cloud occlusion prediction method based on a dense optical flow method, comprising the following steps:

step 1: collecting a real-time sky video by a video collecting device, and converting the real-time sky video into a picture sequence;

step 2: preprocessing the collected picture sequence, eliminating irrelevant image information and only retaining a sky area;

step 3: performing cloud identification and judgment on the obtained sky area;

step 4: performing dense optical flow calculation on the picture sequence obtained in the step 1 to obtain a velocity and direction of each of pixel points;

step 5: determining a cloud cluster movement area according to the obtained velocity of the pixel points;

step 6: removing outliers according to the velocity and direction of the pixel points to correct the cloud cluster movement velocity; and step 7: predicting a start time and an end time of cloud occlusion according to the determined cloud cluster movement area and the corrected cloud cluster movement velocity.

2. The cloud occlusion prediction method based on a dense optical flow method according to claim 1, wherein the video collecting device comprises a plurality of pinhole cameras.

3. The cloud occlusion prediction method based on a dense optical flow method according to claim 1, wherein the video collecting device is an all-sky imager or a common fisheye camera, and the prediction method further comprises coordinate transformation between the step 5 and the step 6.

4. The cloud occlusion prediction method based on a dense optical flow method according to claim 1, wherein in the step 3, the method for cloud identification and judgment comprises a threshold judgment method of a channel ratio, a machine learning method or a deep learning method.

5. The cloud occlusion prediction method based on a dense optical flow method according to claim 1, wherein in the step 4, the dense optical flow method is a Farneback algorithm.

6. The cloud occlusion prediction method based on a dense optical flow method according to claim 5, wherein the Farneback algorithm is used to calculate a velocity and direction of each of pixel points as follows:

firstly, performing graying processing on an image: performing linear transformation on the image, converting the image into an HSV color space, and using a brightness dimension V of the color space as gray information:

$$V = \max(R, G, B)$$

wherein R, G and B respectively represent brightness values of red, green and blue in an RGB color space;

then, regarding a gray value of the image pixel point as a function $f(x,y)$ of a two-dimensional variable, taking an interested pixel point as a center to construct a local coordinate system, and performing binomial expansion on the function, wherein the function is represented as:

$$f(x, y) = f(x) = x^T Ax + b^T x + c$$

wherein x is a two-dimensional column vector, A is a 2×2 symmetric matrix, b is a 2×1 matrix, $f(x)$ is equivalent to $f(x,y)$ and represents a gray value of the pixel point, and c represents a constant term of binomial expansion; if the pixel point moves, the whole polynomial changes, and a displacement is d; A is unchanged before and after the displacement and is separately represented as:

$$f_1(x) = x^T Ax + b_1^T x + c_1$$

$$f_2(x) = x^T Ax + b_2^T x + c_2$$

wherein $b_1$ and $b_2$ respectively represent 2×1 matrix before and after change, and $c_1$ and $c_2$ respectively represent the constant term before and after change;

the constraint is thus obtained:

$$Ad = \Delta b$$

wherein $$\Delta b = \frac{b_2 - b_1}{2}$$

finally, establishing an objective function:

$$\|Ad - b\|^2$$

minimizing the objective function to solve the displacement d, and dividing the displacement d by the time when the displacement occurs to obtain a velocity vector.

7. The cloud occlusion prediction method based on a dense optical flow method according to claim 1, wherein the specific method for the step 5 is as follows:

(1) determining an effective velocity threshold;
(2) removing cloud movement noise data;
(3) calculating cloud detection confidence;
(4) calculating movement confidence; and
(5) determining a cloud cluster movement area according to the confidences of the cloud detection and the movement detection.

8. The cloud occlusion prediction method based on a dense optical flow method according to claim 1, wherein the specific method for the step 6 is as follows:

(1) determining a velocity range of the effective cloud movement;
(2) setting the velocity out of the range to zero and then taking the average direction of the velocities with similar values but different directions;
(3) correcting the velocity in a sliding window from top to bottom and from left to right on a pseudo image generated by calculating the velocity vector in the step 4 by using the sliding window.

9. The cloud occlusion prediction method based on a dense optical flow method according to claim 1, wherein the specific method for the step 7 is as follows:

assuming that center coordinates and a radius of the sun in the sky in the image are respectively $(x_0, y_0)$ and $r_0$; a point on an edge of the Sun's disk is represented by $(x_0+r_0 \cos\theta, y_0+r_0 \sin\theta)$, $0 \le \theta < 2\pi$; and coordinates of a specific cloud pixel point are $(x_1, y_1)$ and the velocity vector is $(u_1, v_1)$;

firstly, judging whether $|v_1\Delta x - u_1\Delta y| \le r_0\sqrt{u_1^2+v_1^2}$ is satisfied, wherein if not, the point cannot reach the sun area and there is no need to continue the calculation;

then, calculating a time $t_1$ of the cloud pixel point reaching the sun, and expressing the time as follows:

$$t_1 = \min\left( \frac{x_1 - x_0 + r_0\cos\left(\sin^{-1}\frac{v_1\Delta x - u_1\Delta y}{r_0\sqrt{u_1^2+v_1^2}} + \tan^{-1}(v_1, u_1)\right)}{u_1}, \frac{x_1 - x_0 + r_0\cos\left(\pi - \sin^{-1}\frac{v_1\Delta x - u_1\Delta y}{r_0\sqrt{u_1^2+v_1^2}} + \tan^{-1}(v_1, u_1)\right)}{u_1} \right)$$

wherein if $t_1$ is less than 0, it indicates that the cloud pixel point moves towards a direction far away from the sun and is discarded;

a leaving time $t_2$ of the cloud pixel point is represented as:

$$t_2 = \max\left( \frac{x_1 - x_0 + r_0\cos\left(\sin^{-1}\frac{v_1\Delta x - u_1\Delta y}{r_0\sqrt{u_1^2 + v_1^2}} + \tan^{-1}(v_1, u_1)\right)}{u_1}, \frac{x_1 - x_0 + r_0\cos\left(\pi - \sin^{-1}\frac{v_1\Delta x - u_1\Delta y}{r_0\sqrt{u_1^2 + v_1^2}} + \tan^{-1}(v_1, u_1)\right)}{u_1} \right)$$

finally, determining an arrival time of each of cloud pixel points, wherein a minimum value is the time when a cloud front end arrives at the solar area, and a maximum value in the leaving times of the cloud pixel points is a predicted time when all the cloud clusters leave the sun area.

10. The cloud occlusion prediction method based on a dense optical flow method according to claim 3, wherein the method for coordinate transformation is as follows:

first, assuming that points in a camera coordinate system are (x,y,z), pixel coordinates are (u,v), and calculating a distance ξ between a camera center and a sphere center, and focal lengths $f_x$ and $f_y$ in x and y directions of the camera coordinate system through known coordinate points by using the following formula:

$$\begin{bmatrix} x \\ y \\ z \end{bmatrix} = \frac{1}{d}\left( \frac{\xi + \sqrt{1 + (1 - \xi^2)(\tilde{u}^2 + \tilde{v}^2)}}{\tilde{u}^2 + \tilde{v}^2 + 1} \begin{bmatrix} \tilde{u} \\ \tilde{v} \\ 1 \end{bmatrix} - \begin{bmatrix} 0 \\ 0 \\ \xi \end{bmatrix} \right)$$

wherein $$\begin{bmatrix} \tilde{u} \\ \tilde{v} \end{bmatrix} = \begin{bmatrix} \frac{u - c_x}{f_x} \\ \frac{v - c_y}{f_y} \end{bmatrix}$$

d is a distance from point (x,y,z) to the origin of the camera coordinate system, and $(c_x, c_y)$ are coordinates of the image center;

then, for the actually collected image, calculating actual coordinates of each pixel through the above two formulas, and then calculating image corresponding to the pinhole camera by combining the following formula:

$$\begin{bmatrix} u' \\ v' \end{bmatrix} = \begin{bmatrix} f_x\frac{x}{z} + c_x \\ f_y\frac{y}{z} + c_y \end{bmatrix}.$$

* * * * *